(12) United States Patent
Montestruque

(10) Patent No.: US 8,258,977 B1
(45) Date of Patent: Sep. 4, 2012

(54) MANHOLE COVER WITH SIGNAL TRANSMITTER

(75) Inventor: Luis Montestruque, Granger, IN (US)

(73) Assignee: Emnet, LLC, South Bend, IN (US)

( * ) Notice: Subject to any disclaimer, the term of this patent is extended or adjusted under 35 U.S.C. 154(b) by 794 days.

(21) Appl. No.: 12/276,811

(22) Filed: Nov. 24, 2008

Related U.S. Application Data

(60) Provisional application No. 61/004,366, filed on Nov. 27, 2007.

(51) Int. Cl.
*G08B 23/00* (2006.01)
(52) U.S. Cl. .................................... 340/870.02
(58) Field of Classification Search ............. 340/870.02, 340/870.07
See application file for complete search history.

(56) References Cited

U.S. PATENT DOCUMENTS

| | | | |
|---|---|---|---|
| 5,608,171 A | 3/1997 | Hunter et al. | |
| 6,518,933 B2 * | 2/2003 | Pecora et al. | 343/793 |
| 7,002,481 B1 | 2/2006 | Crane et al. | |
| 7,292,143 B2 | 11/2007 | Drake et al. | |
| 7,619,878 B1 * | 11/2009 | Cook | 361/672 |
| 2001/0024165 A1 * | 9/2001 | Steen et al. | 340/870.01 |
| 2007/0159326 A1 * | 7/2007 | Quist et al. | 340/539.26 |

* cited by examiner

*Primary Examiner* — Michael Rutland Wallis
(74) *Attorney, Agent, or Firm* — Michael A. Myers; Shumaker, Loop & Kendrick, LLP

(57) ABSTRACT

A manhole cover is for use with a system for transmitting data to an above surface receiver. The manhole cover includes a body suitable for covering a manhole. At least a portion of the body is formed from a radio wave penetrable material so that radio waves may pass through the body. A microprocessor is provided for receiving a signal representing at least one environmental parameter inside a manhole enclosure measured by a sensor, and for responding to the signal by directly or indirectly causing a change to a parameter in the enclosure. A transmitting element in communication with the microprocessor transmits the signal to the surface above the manhole cover. Circuitry connects the microprocessor and the transmitting element for driving the transmitting element to transmit the signal. The microprocessor may be programmed to run an energy conservation cycle, which preserves power from the power source. Any one of numerous antenna designs may be embedded in the body of the cover.

22 Claims, 7 Drawing Sheets

MANHOLE COVER WITH SIGNAL TRANSMITTER

CROSS REFERENCE TO RELATED APPLICATIONS

This application claims the benefit of U.S. Provisional Application No. 61/004,366, filed Nov. 27, 2007, the disclosure of which is hereby incorporated by reference.

BACKGROUND OF THE INVENTION

1. Field of the Invention

The invention relates to manhole enclosures and systems for monitoring environmental parameters in subterranean enclosures. Specifically, the invention relates to a manhole cover with a signal transmitter for wireless monitoring of subterranean enclosures.

2. Description of the Background of the Invention

Wireless transmission of environmental parameters from manhole enclosures presents a number of challenges. The only way for a data signal relating to water depth, flow or temperature, for example, to be communicated wirelessly to the exterior is through a manhole cover; and manhole covers are typically made of metal. If they reach the surface, the radio signals are often too weak to coherently reach their destination. Various devices and methods have been proposed to address the problem.

One such device includes use of an antenna embedded in the road. Generally, an antenna is located on the surface next to the manhole entrance. The antenna may be mounted directly to the road's surface or in a trench to reduce the profile of the antenna on the surface. The antenna is connected to a radio transceiver inside the manhole by way of a coaxial cable. Connecting the underground transceiver to the above ground antenna, however, involves labor and equipment to prepare the surface, install conduit, and wire the components.

Some have tried mounting the antenna directly on the top side of the manhole cover. Like the road-embedded antenna, however, it is difficult to conceal the profile of the antenna because the antenna is mounted on top of the cover. This is particularly troublesome when plowing the road of snow. Another problem deals simply with the mass of the manhole cover; its metallic construction makes it difficult to remove and handle because of its weight. This results in damage to the equipment that may be located underneath the cover when the cover is removed from the manhole.

Another proposed design uses the metal cover itself as the antenna. A slot is machined in the manhole cover, which defines a slot antenna. Besides being self-contained, one advantage of the slot antenna cover is that because there is no antenna attached to the surface, the cover maintains its essentially plan profile. This design, however, does not address the problems associated with the heavy weight of the cover or water, dirt and debris clogging the slot and thus ruining transmission. Additionally, machining the slot antenna and connecting it to the transceiver adds to the cost of this device and cover.

Accordingly, there remains a need for an improved manhole cover with a signal transmitter for wireless monitoring of a subterranean enclosure. The present invention is directed toward meeting this need.

SUMMARY OF THE INVENTION

In one embodiment of the present invention there is provided a manhole cover for use with a system for transmitting data to an above surface receiver. The data represent an environmental parameter in a manhole enclosure. The manhole cover includes a body suitable for covering a manhole. At least a portion of the body is formed from a radio wave penetrable material so that radio waves may pass through the body. A microprocessor is provided for receiving a signal representing at least one environmental parameter measured by a sensor, and for responding to the signal by directly or indirectly causing a change to a parameter in the manhole enclosure. A transmitting element in communication with the microprocessor transmits the signal to the surface above the manhole cover. Circuitry connects the microprocessor and the transmitting element for driving the transmitting element to transmit the signal. The microprocessor and circuitry are powered by a power source.

In one aspect of the invention, part of the body may be formed from iron. The radio-wave-penetrable material may be a composite material that includes fiberglass and resin.

In another aspect, the microprocessor, circuitry, and power source may be contained in a housing attached to the body of the manhole cover.

In yet another aspect, the microprocessor may conserve the use of energy from the power source by controlling a power managing cycle. The cycle may include the steps of: (i) powering and reading the measurement taken by the sensor; (ii) processing the measurement for transmission; (iii) powering a radio transceiver and sending the data signal via the transmitting element to a location above the surface; (iv) placing the microprocessor and other components in the system in low-power sleep for a predetermined period of time; and (v) awakening the microprocessor from the low-power sleep and repeating the steps.

In still another aspect, the microprocessor may be programmed to respond to the signal by directly or indirectly causing a change to a parameter in the manhole enclosure.

One object of the present invention is to provide an improved manhole cover with a signal transmitter for wireless monitoring of a subterranean enclosure. Related objects and advantages of the present invention will be apparent from the following description.

DETAILED DESCRIPTION OF INVENTION

Figure 1:
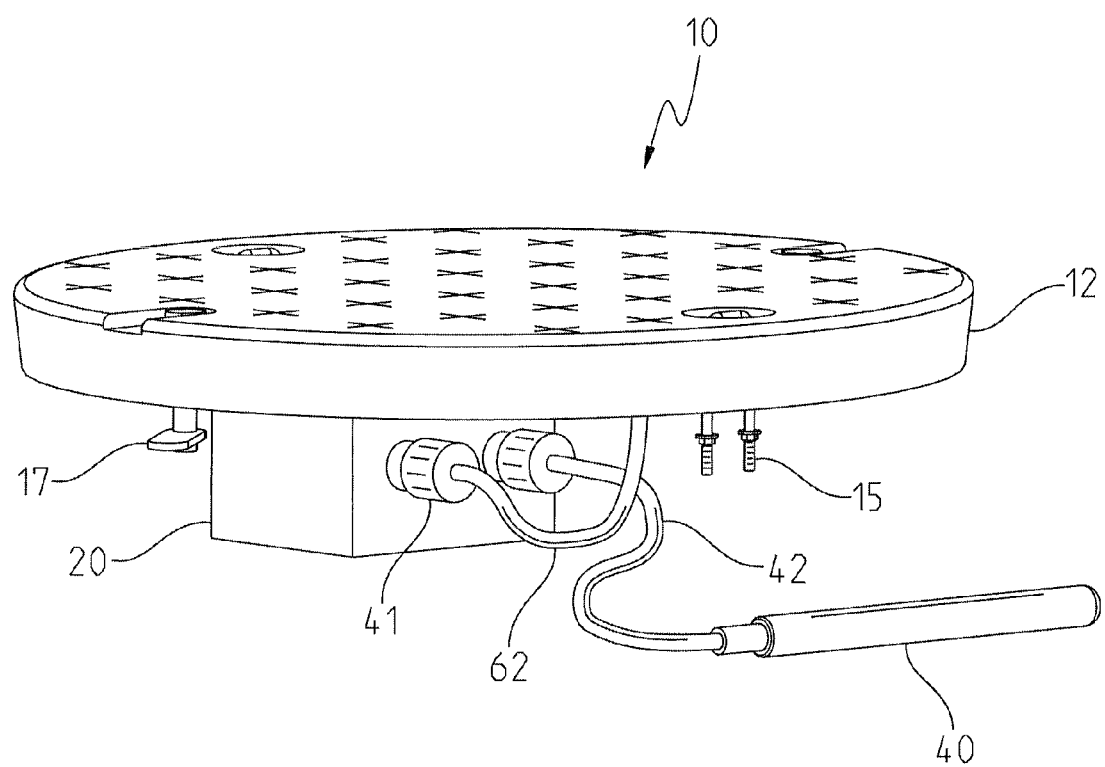
FIG. 1 is an isometric view showing an embodiment of the manhole cover of the invention.
Figure 2:
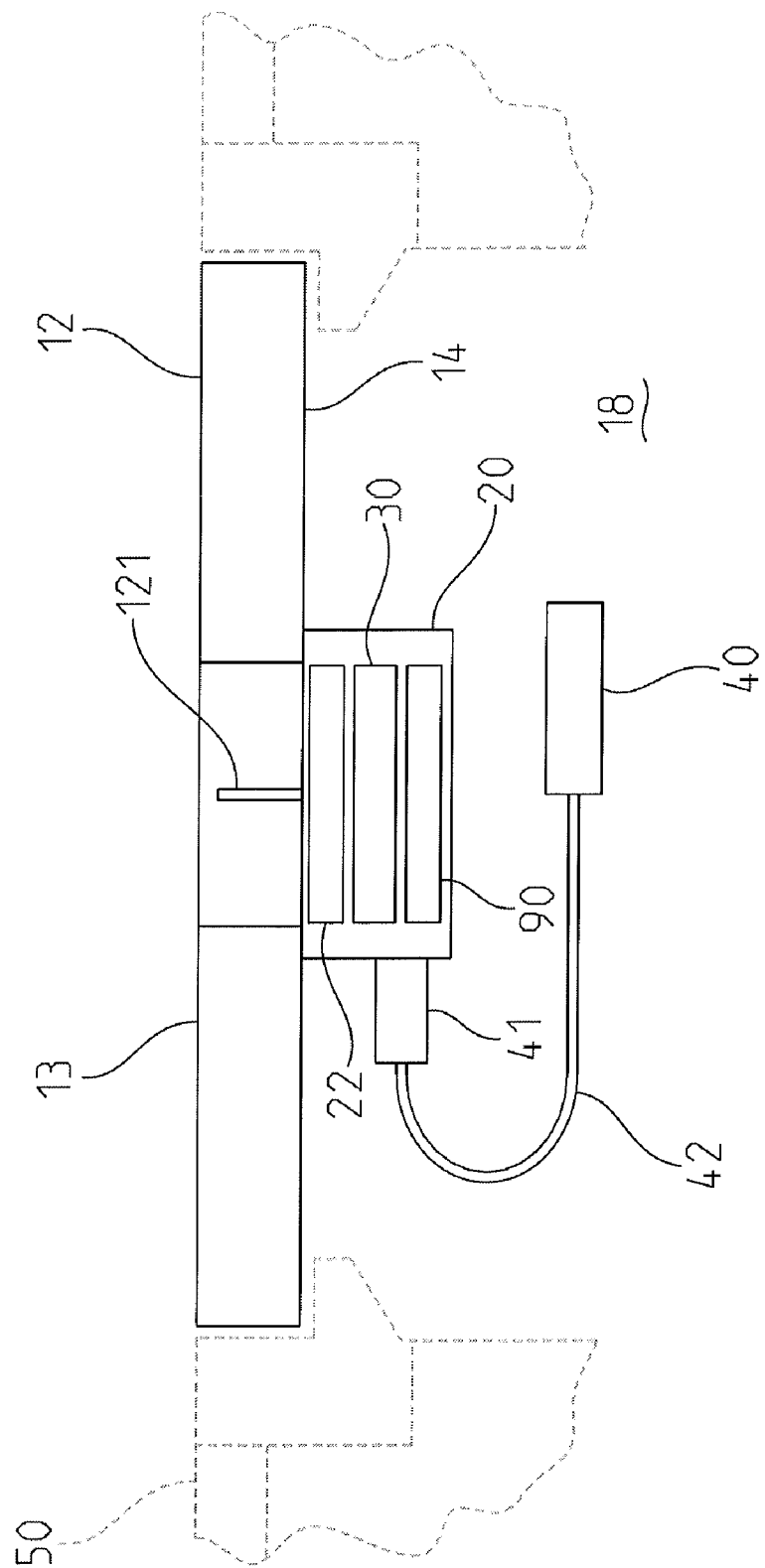
FIG. 2 is a side diagrammatic view showing an embodiment of the manhole cover of the invention positioned over a manhole enclosure.
Figure 3:
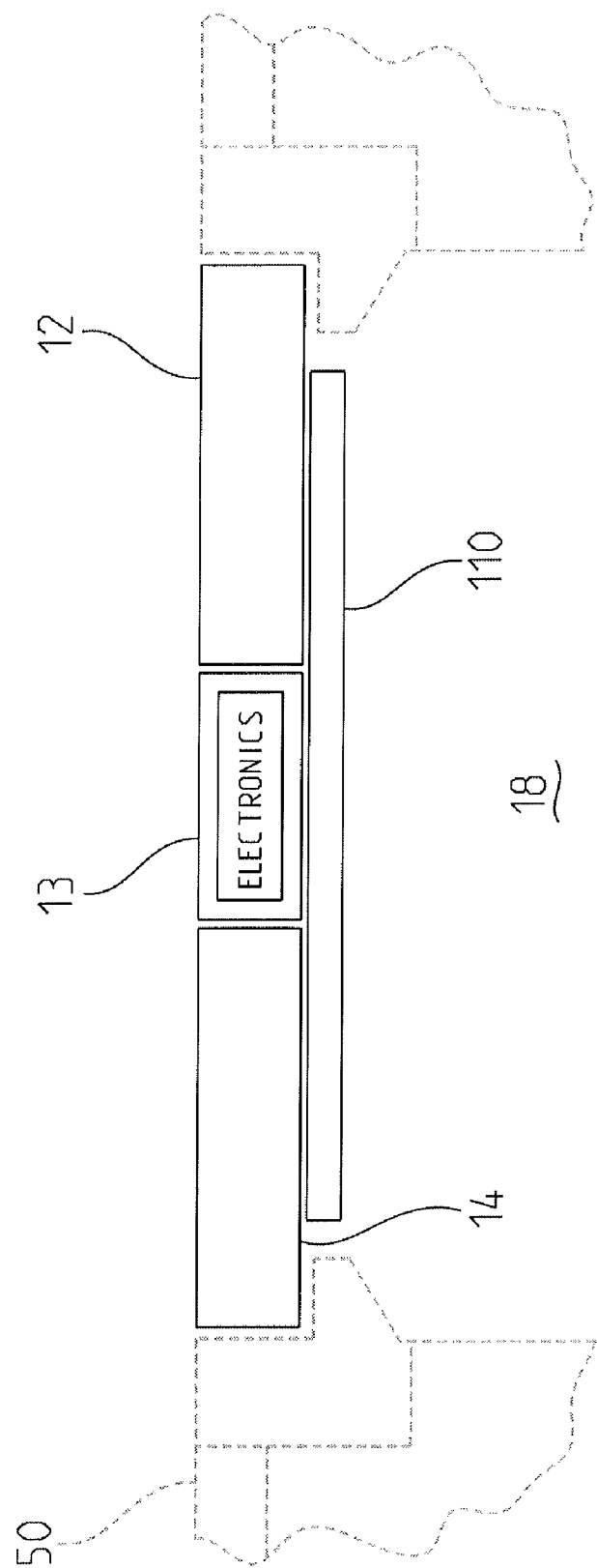
FIG. 3 is a side diagrammatic view showing another embodiment of the manhole cover of the invention positioned over a manhole enclosure.
Figure 4:
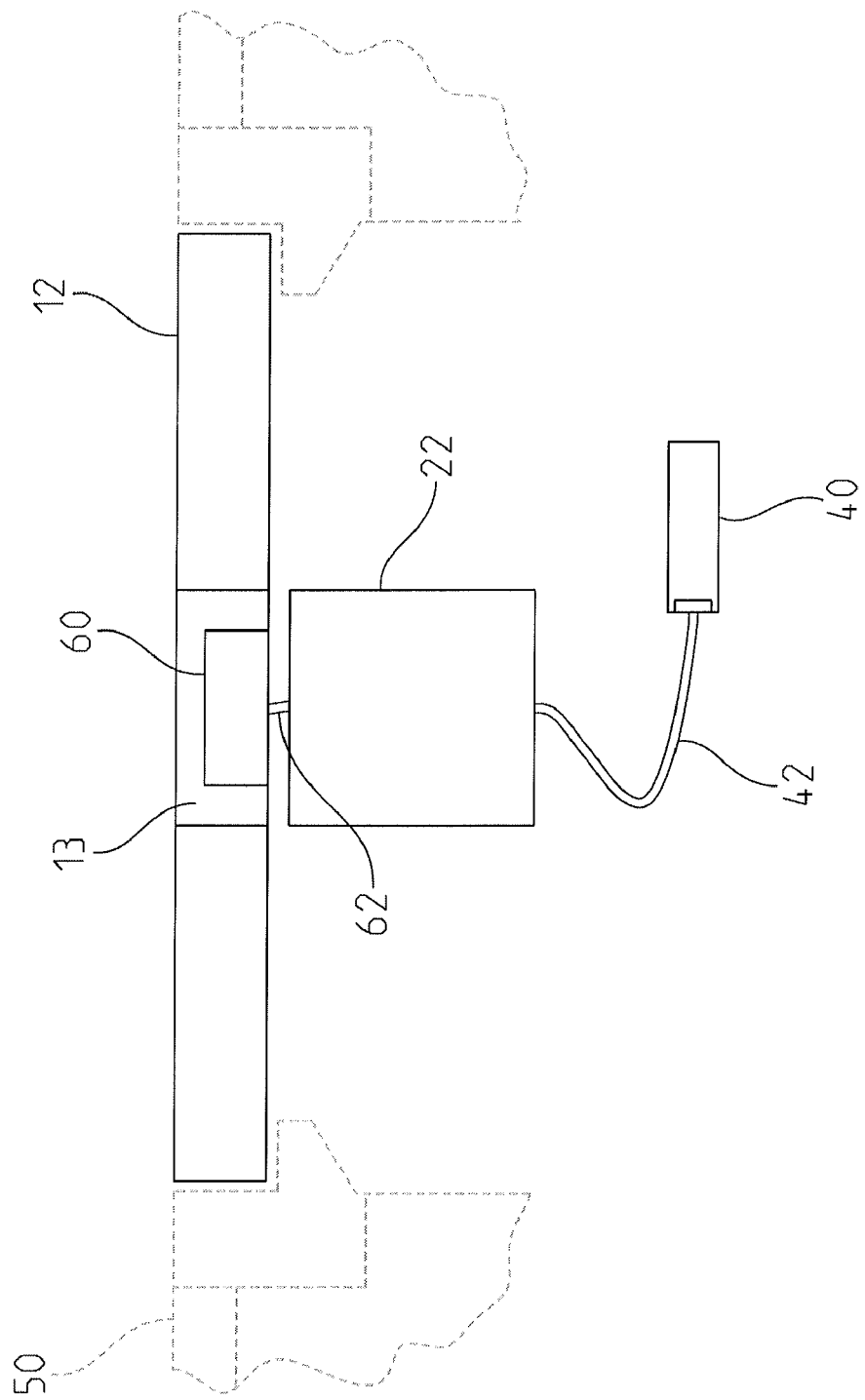
FIG. 4 is a side diagrammatic view showing yet another embodiment of the manhole cover of the invention positioned over a manhole enclosure.
Figure 5:
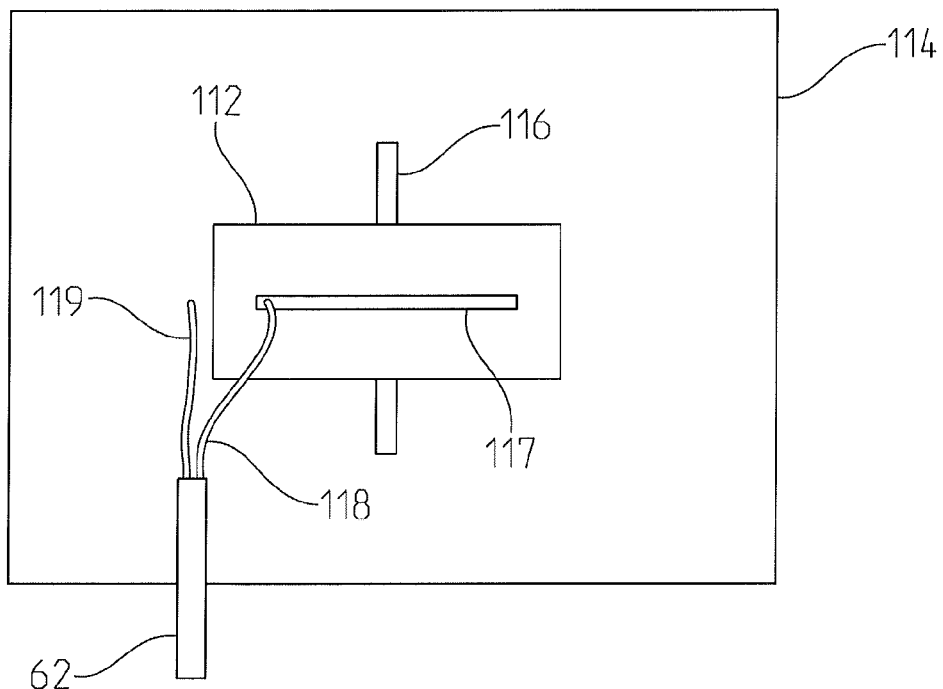
FIG. 5 is diagrammatic view of a slot antenna design that may be used in connection with the manhole cover.
Figure 6:
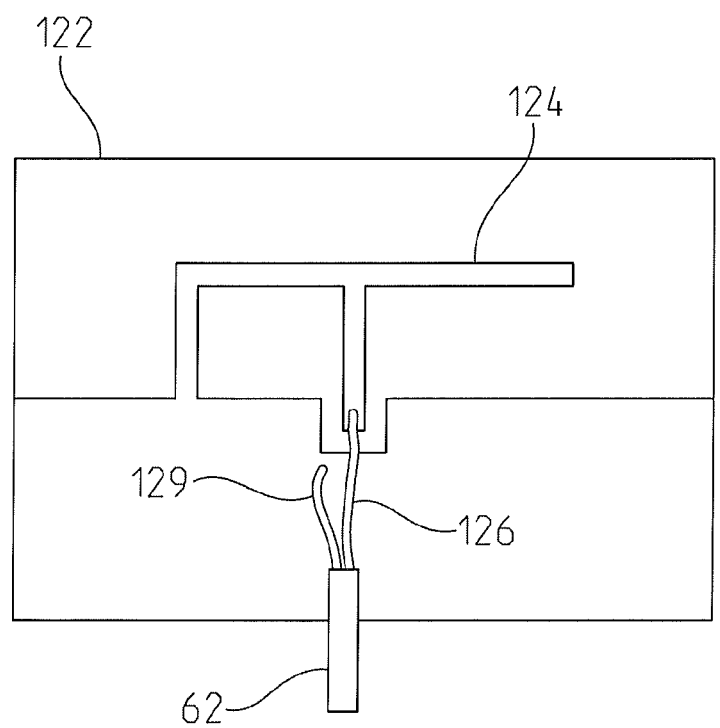
FIG. 6 is a diagrammatic view of an inverted F antenna design that may be used in connection with the manhole cover.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The manhole cover 10 includes a body 12 that is suitable for covering a manhole. At least a portion of the body 12 is preferably formed from a radio wave penetrable material so that radio waves can pass through the body 12. In one embodiment, the entire body 12 is made from a composite formed from a mixture of substances selected from the group consisting of polyester, glass fiber, epoxies, vinyl ester resins, and foam. The mixture may be injection molded and undergo a resin transfer process. Applicant has found that GMI Composites, Inc., and Custom Composites, Inc., both of Michigan, U.S.A., are capable of producing body 12 in accordance with the physical performance properties desirable in the invention as described in this description.

In another embodiment, due to the low temperature and flexibility of the construction of body 12, the transmitting element or antenna 60 and/or all the electronics of the invention associated with the data acquisition, power, and radio transmission may also be embedded in the body 12 of the manhole cover 10. This produces a compact manhole cover unit that is self-contained, has a low profile, and is lightweight and easy to handle. In yet another embodiment, at least a portion of the body 12 is cast from iron, and the body includes another portion formed from radio wave penetrable material. In that embodiment, the transmitting element 60 may be embedded in the wave penetrable material.

The body 12 may include indentions and bores for receiving and attaching typical items such as U-shaped bolts 15 for lifting cover 10 and lock(s) 17 for locking the cover 10 in place after the cover is positioned over enclosure 18.

With reference to the examples illustrated in FIGS. 2-8, the electronic components of the system include a microprocessor 30, a transmitting element or antenna 60, circuitry 122, which preferably includes a radio transceiver 22, and a power source 90. In one embodiment, these components are housed in an explosion-proof housing 20, which is secured to the underside 14 of the manhole cover. In that embodiment, the housing 20, which may be required by regulations, protects the components from corrosive gases and explosions. At least a portion 121 of the transmitting element 60 is preferably embedded in the body 12 of the manhole cover so that signal transmission may be optimal. In another embodiment, the microprocessor, transmitting element, circuitry, and power source are operatively housed in the body 12 of the manhole cover 10. The electrical components may be embedded in the material or otherwise encapsulated within the manhole cover, as depicted diagrammatically in FIG. 3 for example.

The circuitry electrically connects the microprocessor and the antenna and includes a radio transceiver, which drives the antenna to transmit the signal. The power source may be a battery pack, photocells, or other known power source capable of powering the system as described herein. In one embodiment, four D-cell lithium cells serve as the power source.

In use, the microprocessor 30 collects environmental sensory data from, for example, a sewer system and transmits the data to an above surface receiver. Such data may include a number of different parameters such as water depth, flow, temperature, and so on. These parameters may be measured using a number of commercially available sensors 40 that convert corresponding data into a signal. The system may be configured to handle numerous sensors as desired. The microprocessor 30 receives the signal(s) from the sensor(s) and transmits the signal(s) to the radio transceiver 22 for transmission, as shown in the flow diagram presented in FIG. 8.

The antenna 60 may define, for example, an inverted F antenna that has a portion 121 embedded in the body 12 of the cover 10, a slot antenna, a disk dipole antenna, or several antennas each with a corresponding radiating pattern (not shown). Referring particularly to FIGS. 2-8, the slot antenna (see FIG. 5) preferably includes a circuit board 112 and transceiver assembly having copper trace 117 affixed to a metal plate 114, which may serve as a transmitting element 60, and which may be secured to the underside 14 of body 12. Cable 62 is connected to the circuitry via conductor 118. The embodiment using the inverted F antenna may include circuit board 122 and a copper trace 124 on the board in the shape of an F. The center conductor 126 of cable 62 electrically connects the board to the power source. The sample board 122, which is illustrated in an upstanding position, may be embedded in the cover oriented as shown.

Figure 7:
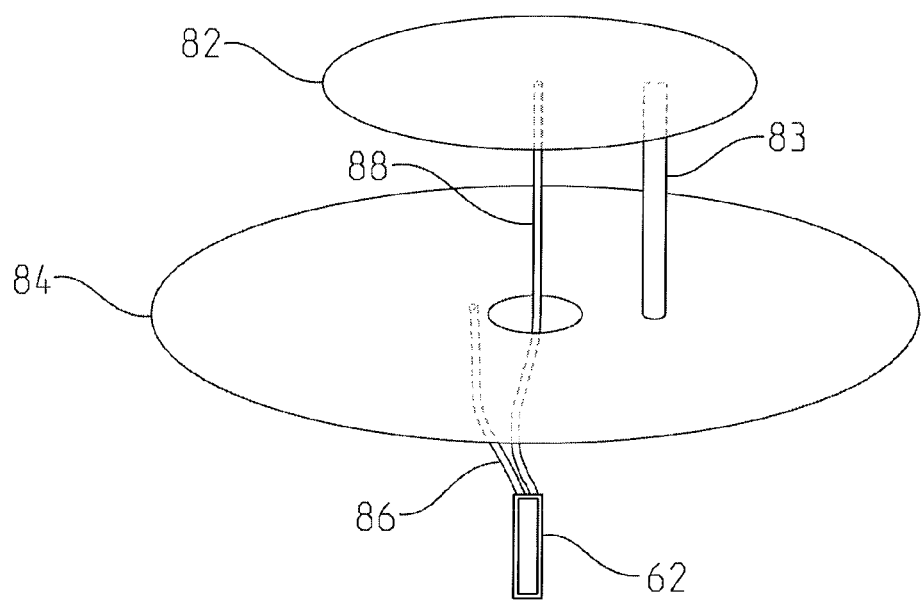
FIG. 7 is a diagrammatic view of a disc dipole antenna design that may be used in connection with the manhole cover.
Figure 8:
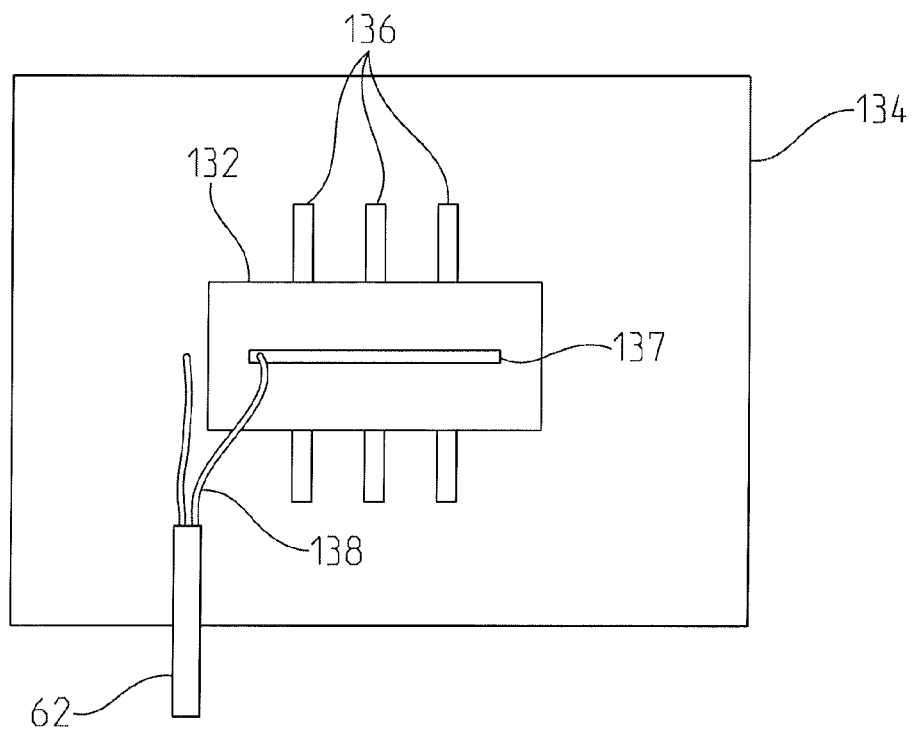
FIG. 8 is a diagrammatic view of a slot array antenna design that may be used in connection with the manhole cover of the invention.

The disc dipole antenna embodiment of FIG. 7, which is shown enlarged for ease of study, may include a top disc 82, a bottom disc 84 and a stub 83 extending there between. As with the other examples, a central conductor 88 by way of cable 62 electrically connects the antenna and the power source. In another embodiment, the transmitting element 60 is a plurality of antennas, each of which emits a corresponding radiating pattern. The slot array antenna (see FIG. 8) preferably includes a circuit board 132 and transceiver assembly having copper trace 137 affixed to a metal plate 134 that includes an array of slots 136, and which may be secured to the underside 14 of body 12. Cable 62 is connected to the circuitry via conductor 138. Metal plate 134 serves as transmitting element 60.

The above antennae embodiments serve only as examples. Most preferably, transmitting element or antenna 60 assumes any configuration so long as the profile of the manhole cover 10 is preserved and the signal optimally transmitted.

Figure 9:
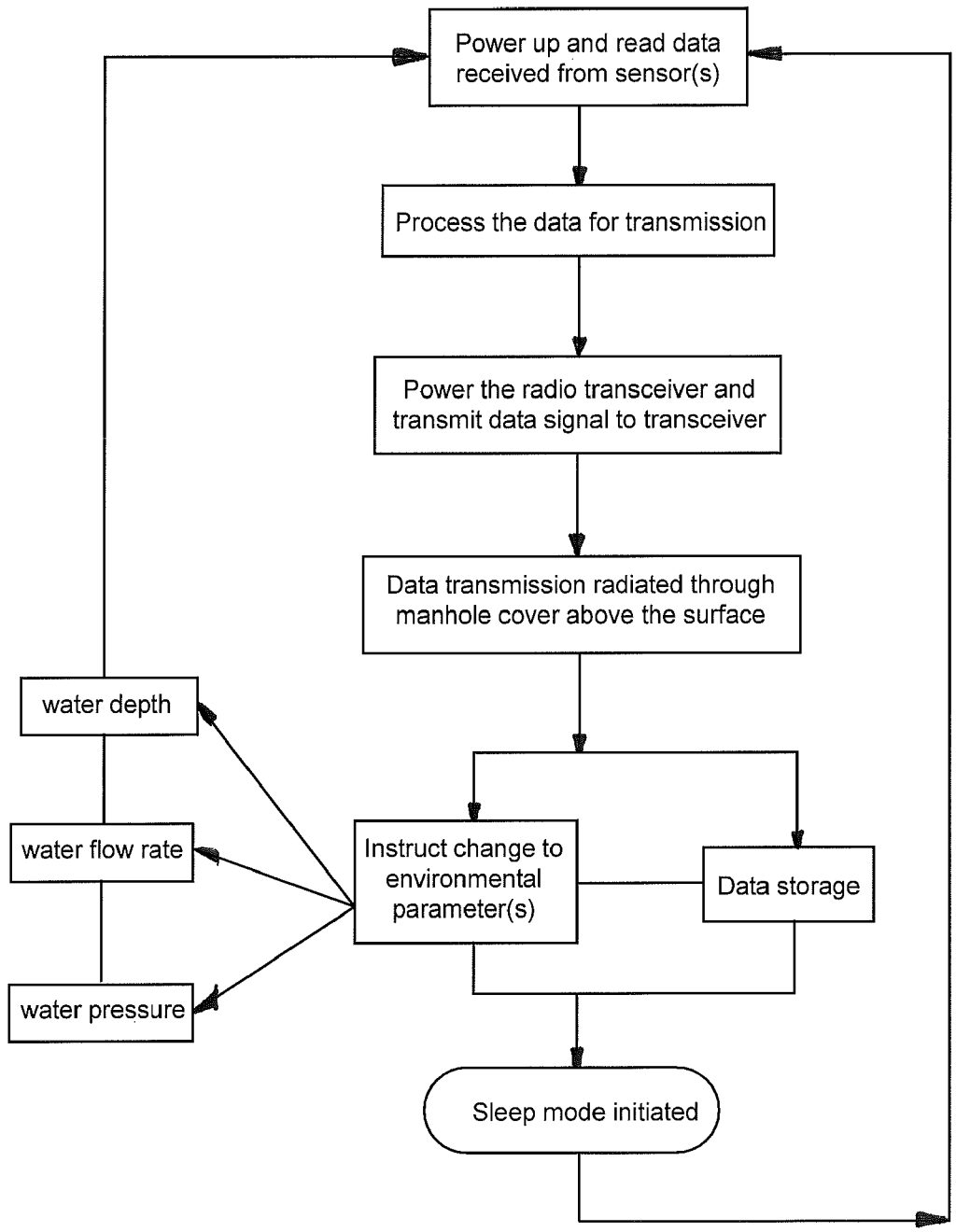
FIG. 9 is flow diagram highlighting the functionality of an embodiment of the microprocessor of the invention.

With particular reference to FIG. 9, because power is limited by the capacity of a battery pack, the microprocessor also directs and performs a power management cycle for conserving energy. One such preferred cycle includes the following steps: (i) the microprocessor powers and reads the measurement taken by a sensor; (ii) the microprocessor processes the measurement for transmission; (iii) the microprocessor powers the radio transceiver and sends the data signal; (iv) the radio transceiver utilizes the antenna to radiate the data transmission above the surface; (v) the microprocessor places itself and other components in the system in low-power sleep for a predetermined period of time; and (vi) the microprocessor awakes from the low power sleep and the cycle repeats.

An above surface monitoring and control system receives the data transmitted by the present invention and sends the data to the database for storage and later display and analysis. Such a distributed wireless system is disclosed in the Applicant's prior application, U.S. Ser. No. 11/437,384, titled Distributed Monitoring and Control System, now U.S. Pat. No.

7,792,126. As depicted diagrammatically in FIG. 9, the microprocessor of the cover 10 may also be configured to respond to the signal by directly or indirectly causing a change to a parameter in the manhole enclosure. A signal may be sent to remotely operate a gate, for example, to direct flow from a wastewater treatment facility during wet weather conditions to prevent a combined sewer overflow incident.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

What is claimed is:

1. A manhole cover for use with a system for transmitting data to an above surface receiver, the data representing an environmental parameter in a manhole enclosure, the manhole cover comprising:
   a body suitable for covering a manhole, at least a portion of the body is formed from a radio wave penetrable material so that radio waves may pass through the body;
   a microprocessor for receiving a signal representing at least one environmental parameter measured by a sensor, and for responding to the signal by directly or indirectly causing a change to a parameter in the manhole enclosure;
   a transmitting element in communication with the microprocessor and effective for transmitting the signal to the surface above the manhole cover; wherein said microprocessor and said circuitry and said power source are contained in a housing, and the housing is attached to the body of the manhole cover; wherein the radio wavepenetrable material is a composite formed from a mixture of substances selected from the group consisting of polyester, glass fiber, epoxies, vinyl ester resins, and foam;
   circuitry connecting the microprocessor and the transmitting element for driving the transmitting element to transmit the signal; and a power source for powering the microprocessor and the circuitry.

2. A manhole cover according to claim 1, wherein at least a part of the body is formed of iron.

3. A manhole cover according to claim 2, wherein the microprocessor and the circuitry and the power source are in the body of the manhole cover.

4. A manhole cover according to claim 3, wherein said radio wave penetrable material is a composite material that includes fiberglass and resin.

5. A manhole cover according to claim 1, wherein said microprocessor performs a power management cycle for conserving energy used by the power source.

6. A manhole cover according to claim 4, wherein said microprocessor performs a power management cycle for conserving energy used by the power source.

7. A manhole cover according to claim 6, wherein the transmitting element is an inverted F antenna with at least a portion embedded within the body of the cover.

8. A manhole cover according to claim 6, wherein the transmitting element is a slot antenna secured to the underside of the cover.

9. A manhole cover according to claim 6, wherein said transmitting element is a disk dipole antenna with a portion embedded within the body of the cover.

10. A manhole cover according to claim 6, wherein said transmitting element is a plurality of antennas, each of said plurality of antennas includes a corresponding radiating pattern.

11. A manhole cover according to claim 6, wherein at least a portion of the transmitting element is in the body of the manhole cover.

12. A manhole cover for use with a system for transmitting data to an above surface receiver, the data representing an environmental parameter in a manhole enclosure, the manhole cover comprising:
    a body suitable for covering a manhole, at least a portion of the body is formed from a radio wave penetrable material so that radio waves may pass through the body;
    a microprocessor for receiving a signal representing at least one environmental parameter measured by a sensor;
    a transmitting element with at least a portion embedded within the body in communication with the microprocessor and effective for transmitting the signal to the surface above the manhole cover;
    circuitry connecting the microprocessor and the transmitting element for driving the transmitting element to transmit the signal; and
    a power source for powering the microprocessor and the circuitry wherein the microprocessor conserves the use of energy from the power source by controlling a power managing cycle comprising the steps of powering and reading the measurement taken by the sensor, processing the measurement for transmission, powering a radio transceiver and sending the data signal via the transmitting element to a location above the surface, placing the microprocessor and other components in the system in low-power sleep for a predetermined period of time, awakening the microprocessor from the low-power sleep and repeating the steps.

13. A manhole cover according to claim 12, wherein the microprocessor is capable of responding to the signal by directly or indirectly causing a change to a parameter in the manhole enclosure.

14. A manhole cover according to claim 13, wherein at least a part of the body is formed of iron.

15. A manhole cover according to claim 14, wherein said microprocessor and said circuitry and said power source are contained in a housing, and the housing is attached to the body of the manhole cover.

16. A manhole cover according to claim 14, wherein the microprocessor and the circuitry and the power source are in the body of the manhole cover.

17. A manhole cover according to claim 13, wherein the radio wave penetrable material is a composite material that includes fiberglass and resin.

18. A manhole cover according to claim 17, wherein the transmitting element is an inverted F antenna with at least a portion embedded within the body of the cover.

19. A manhole cover according to claim 17, wherein the transmitting element is a slot antenna secured to the underside of the cover.

20. A manhole cover according to claim 17, wherein said transmitting element is a disk dipole antenna with a portion embedded within the body of the cover.

21. A manhole cover according to claim 17, wherein said transmitting element is a plurality of antennas, each of said plurality of antennas includes a corresponding radiating pattern.

22. A manhole cover according to claim 17, wherein at least a portion of the transmitting element is in the body of the manhole cover.

* * * * *